US011615155B1

(12) United States Patent
Seo

(10) Patent No.: US 11,615,155 B1
(45) Date of Patent: Mar. 28, 2023

(54) METHOD OF PROVIDING USER INTERFACE FOR RETRIEVING INFORMATION ON E-BOOK AND SERVER USING THE SAME

(71) Applicant: Millie, Seoul (KR)

(72) Inventor: Young Taek Seo, Seoul (KR)

(73) Assignee: Millie, Seoul (KR)

( * ) Notice: Subject to any disclaimer, the term of this patent is extended or adjusted under 35 U.S.C. 154(b) by 0 days.

(21) Appl. No.: 17/825,880

(22) Filed: May 26, 2022

(30) Foreign Application Priority Data

Dec. 14, 2021 (KR) .......................... 10-2021-0179196

(51) Int. Cl.
*G06F 16/953* (2019.01)
*G06F 3/04847* (2022.01)
*G06F 16/951* (2019.01)
*G06F 3/0481* (2022.01)
*G06F 9/451* (2018.01)
*G06F 3/04845* (2022.01)

(52) U.S. Cl.
CPC .......... *G06F 16/953* (2019.01); *G06F 3/0481* (2013.01); *G06F 3/04845* (2013.01); *G06F 3/04847* (2013.01); *G06F 9/451* (2018.02); *G06F 16/951* (2019.01)

(58) Field of Classification Search
CPC ............... G06F 3/0481; G06F 3/04845; G06F 3/04847; G06F 9/451; G06F 16/951; G06F 16/953
See application file for complete search history.

(56) References Cited

U.S. PATENT DOCUMENTS

| 7,216,116 B1 * | 5/2007 | Nilsson | ............... G06F 16/2428 |
| 8,260,915 B1 * | 9/2012 | Ashear | ................... H04L 43/04 |
| | | | 709/224 |
| 8,554,640 B1 * | 10/2013 | Dykstra | ............... G06Q 10/101 |
| | | | 705/26.7 |

(Continued)

FOREIGN PATENT DOCUMENTS

| KR | 10-2010-0102833 A | 9/2010 |
| KR | 10-2014-0098314 A | 8/2014 |
| KR | 10-2016-0009935 A | 1/2016 |

*Primary Examiner* — Eric J. Bycer
(74) *Attorney, Agent, or Firm* — PCFB LLC

(57) ABSTRACT

User interface for retrieving information on an e-book is provided. The server acquires information on complete-reading probabilities including information on a first complete-reading probability to information on an n-th complete-reading probability and information on complete-reading expected times including information on a first complete-reading expected time to information on an n-th complete-reading expected time; provides a first UI element capable of allowing the information on the complete-reading probabilities to be set and a second UI element capable of allowing the information on the complete-reading expected times to be set; and in response to detecting that information on a specific complete-reading probability range set through the first UI element and information on a specific complete-reading expected time range set through the second UI element are inputted by the user terminal, retrieves information on one or more specific e-books and then provides the retrieved information on the specific e-books to the user terminal.

18 Claims, 7 Drawing Sheets

(56) References Cited

U.S. PATENT DOCUMENTS

| | | | | |
|---|---|---|---|---|
| 8,688,712 | B1* | 4/2014 | Klara | G06F 16/41 |
| | | | | 707/748 |
| 9,153,141 | B1* | 10/2015 | Kane, Jr. | G09B 7/00 |
| 2010/0223258 | A1* | 9/2010 | Ghahramani | G06F 16/3346 |
| | | | | 707/723 |
| 2011/0320276 | A1* | 12/2011 | Ray | G06Q 30/02 |
| | | | | 705/14.53 |
| 2012/0303600 | A1* | 11/2012 | Mukhopadhyay | G06F 40/253 |
| | | | | 707/706 |
| 2013/0041774 | A1* | 2/2013 | Emura | G06Q 30/0251 |
| | | | | 705/26.7 |
| 2013/0151954 | A1* | 6/2013 | Ierullo | G06F 3/04842 |
| | | | | 715/254 |
| 2013/0185198 | A1* | 7/2013 | Lorch | G06Q 30/0601 |
| | | | | 705/39 |
| 2014/0025532 | A1* | 1/2014 | Huang | G06Q 30/0631 |
| | | | | 705/26.7 |
| 2014/0289241 | A1* | 9/2014 | Anderson | G06F 16/48 |
| | | | | 707/736 |
| 2014/0325407 | A1* | 10/2014 | Morris | G06F 3/04883 |
| | | | | 715/765 |
| 2014/0337776 | A1* | 11/2014 | O'Donoghue | G06F 3/0483 |
| | | | | 715/771 |
| 2015/0006258 | A1* | 1/2015 | Salama | G06Q 10/00 |
| | | | | 705/7.35 |
| 2019/0018819 | A1* | 1/2019 | Zhong | G09G 5/10 |

* cited by examiner

FIG. 2

SERVER ACQUIRING (I) INFORMATION ON A FIRST REFERENCE READ PAGE TO AN N-TH REFERENCE READ PAGE, EACH OF WHICH IS READ BY ONE OR MORE USERS AMONG EACH OF A FIRST REFERENCE TOTAL PAGE TO AN N-TH REFERENCE TOTAL PAGE INCLUDED IN EACH OF A FIRST ELECTRONIC BOOK TO AN N-TH ELECTRONIC BOOK; AND (II) INFORMATION ON A FIRST REQUIRED TIME TO AN N-TH REQUIRED TIME, EACH OF WHICH IS TIME TAKEN FOR THE USERS TO READ EACH OF THE FIRST REFERENCE READ PAGE TO THE N-TH REFERENCE READ PAGE —S210

IN RESPONSE TO DETECTING THAT THE SPECIFIC ELECTRONIC BOOK IS SELECTED BY THE SPECIFIC USER OR BY A PREDETERMINED ALGORITHM, THE SERVER (I) ACQUIRES AT LEAST PART OF INFORMATION ON A SPECIFIC COMPLETE-READING PROBABILITY AND INFORMATION ON A SPECIFIC COMPLETE-READING EXPECTED TIME FOR THE SPECIFIC ELECTRONIC BOOK BY REFERRING TO (1) INFORMATION ON A SPECIFIC REFERENCE TOTAL PAGE CORRESPONDING TO THE SPECIFIC ELECTRONIC BOOK AND (2) AT LEAST PART OF INFORMATION ON A SPECIFIC REFERENCE READ PAGE WHICH IS A PAGE READ BY THE USERS AMONG THE SPECIFIC REFERENCE TOTAL PAGE AND INFORMATION ON A SPECIFIC REQUIRED TIME WHICH IS TIME TAKEN BY THE USERS TO READ THE SPECIFIC REFERENCE READ PAGE AND (II) MATCHES AT LEAST PART OF THE INFORMATION ON THE SPECIFIC COMPLETE-READING PROBABILITY AND THE INFORMATION ON THE SPECIFIC COMPLETE-READING EXPECTED TIME WITH THE SPECIFIC ELECTRONIC BOOK —S220

FIG. 4

ON CONDITION THAT AT LEAST PART OF INFORMATION ON COMPLETE-READING PROBABILITIES INCLUDING INFORMATION ON A FIRST COMPLETE-READING PROBABILITY TO INFORMATION ON AN N-TH COMPLETE-READING PROBABILITY AND INFORMATION ON COMPLETE-READING EXPECTED TIMES INCLUDING INFORMATION ON A FIRST COMPLETE-READING EXPECTED TIME TO INFORMATION ON AN N-TH COMPLETE-READING EXPECTED TIME HAVE BEEN ACQUIRED BY REFERRING TO (I) EACH PIECE OF INFORMATION ON A FIRST REFERENCE TOTAL PAGE TO AN N-TH REFERENCE TOTAL PAGE INCLUDED IN EACH OF A FIRST ELECTRONIC BOOK TO AN N-TH ELECTRONIC BOOK AND (II) (II-1) EACH PIECE OF INFORMATION ON A FIRST REFERENCE READ PAGE TO AN N-TH REFERENCE READ PAGE, EACH OF WHICH IS READ BY ONE OR MORE USERS AMONG EACH OF THE FIRST REFERENCE TOTAL PAGE TO THE N-TH REFERENCE TOTAL PAGE AND (II-2) EACH PIECE OF INFORMATION ON A FIRST REQUIRED TIME TO AN N-TH REQUIRED TIME, EACH OF WHICH IS TIME TAKEN FOR THE USERS TO READ EACH OF THE FIRST REFERENCE READ PAGE TO THE N-TH REFERENCE READ PAGE, THE SERVER, PROVIDING AT LEAST PART OF A FIRST UI ELEMENT CAPABLE OF ALLOWING THE INFORMATION ON THE COMPLETE-READING PROBABILITIES TO BE SET AND A SECOND UI ELEMENT CAPABLE OF ALLOWING THE INFORMATION ON THE COMPLETE-READING EXPECTED TIMES TO BE SET —S410

IN RESPONSE TO DETECTING THAT AT LEAST PART OF INFORMATION ON A SPECIFIC COMPLETE-READING PROBABILITY SET THROUGH THE FIRST UI ELEMENT AND INFORMATION ON A SPECIFIC COMPLETE-READING EXPECTED TIME SET THROUGH THE SECOND UI ELEMENT ARE INPUTTED BY THE USER TERMINAL, THE SERVER RETRIEVING INFORMATION ON AT LEAST ONE SPECIFIC ELECTRONIC BOOK WHICH IS DETERMINED AS BEING MATCHED WITH AT LEAST PART OF THE INFORMATION ON THE SPECIFIC COMPLETE-READING PROBABILITY AND THE INFORMATION ON THE SPECIFIC COMPLETE-READING EXPECTED TIME AND THEN PROVIDING THE RETRIEVED INFORMATION ON THE SPECIFIC ELECTRONIC BOOK TO THE USER TERMINAL —S420

FIG. 6

COMPLETE-READING INDEX RETRIEVAL ( 60%–80% ) ( 0MIN–120MIN ) ( STOCKS ) ( DESCENDING ORDER OF COMPLETE-READING PROBABILITY )

※ CHANGE CONDITION

24 BOOKS WERE FOUND

| Title | Author | % | Time |
|---|---|---|---|
| ANT INVESTMENT ABSOLUTE FORMULA THAT SURPRISES THOSE IN POWER | BY JOO-YOUNG LEE | 74% | 80MIN |
| SNOWBALL PROMISING BUSINESS 48 SELECTIONS | BY JONG-HYUN LEE | 73% | 59MIN |
| JACKPOT INVESTMENT IN VIETNAM IN JUST ONE DAY | BY HYUN-SOO KIM, EUN-GIL YOO | 73% | 104MIN |
| I HAVE NO HOUSE BUT WANT TO BUY US STOCKS | BY KI-SEONG NAM | 70% | 111MIN |
| POST-COVID19 URGENT CHECK ON FINANCE | BY IL-HO MOON | 68% | 69MIN |
| US STOCK SMALLCAP INSIDE 2021 | BY SEOK-HOON AHN/DONG-SIK KIM/BEOM-JOON KIM ET AL | 68% | 87MIN |
| OVERSEAS STOCK INVESTMENT COMPLETION IN JUST 7 DAYS | BY EUI-SEONG JANG | 67% | 107MIN |
| I FOUND A LIFETIME JOB WITH STOCK INVESTMENT | BY WON-CHEOL CHOI | 67% | 112MIN |
| 20 VITAL POINTS FOR SOARING STOCK: BASICS | BY BYEONG-CHEOL KIM | 64% | 115MIN |
| I LIKE STOCKS FOR PUBLIC SUBSCRIPTION MORE THAN STUDIO APARTMENT | BY BYUNG-HWA LEE | 64% | 113MIN |
| THANK YOU PENNY | BY CHAE-HEE KOO | 64% | 110MIN |
| BE AN INVESTING ANT RATHER THAN A PERSON WHO JUST WORKS | BY JAE-MIN LEE | 64% | 91MIN |
| SAVE $100K, AT NO CONDITION, BY AGE OF 30 | BY SANG-WON LEE | 63% | 87MIN |
| FOURTH INDUSTRIAL REVOLUTION, INVEST INTO THE ITEM THAT WILL GROW BY 10 TIMES | BY SANG-HEON LEE | 63% | 90MIN |
| BE WEALTHY WITH STOCK BY INVESTING 30 MINUTES IN A YEAR | BY JEONG-RAE KIM | 62% | 81MIN |
| ULTRA BUBBLE AGE, FUTURE OF STOCK INVESTMENT | BY YE-EUN KIM | 62% | 119MIN |

610
620

FIG. 7
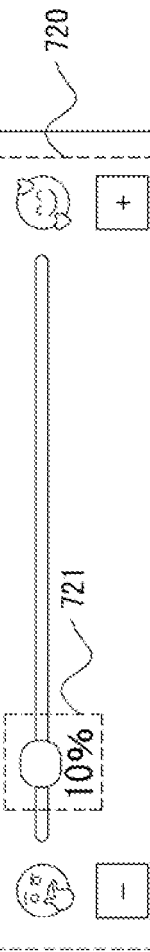
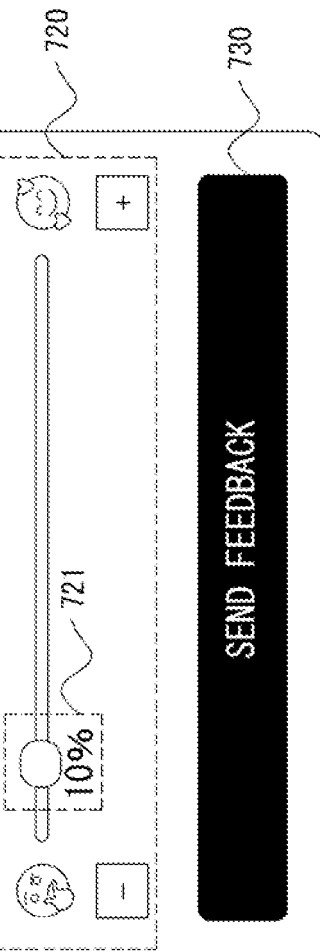

METHOD OF PROVIDING USER INTERFACE FOR RETRIEVING INFORMATION ON E-BOOK AND SERVER USING THE SAME

CROSS REFERENCE TO RELATED APPLICATION

This application claims the benefit of the earlier filing date of Korean patent application No. 10-2021-0179196, filed Dec. 14, 2021, the entire contents and disclosure of which being incorporated herein by reference.

FIELD OF THE DISCLOSURE

The present disclosure relates to a method of providing a user interface for retrieving information on an electronic book, and a server using the same.

BACKGROUND OF THE DISCLOSURE

Since a service of providing electronic books was implemented, people got easy access to various books. Specifically, unlike the conventional books, the electronic books have advantages in that they do not take space as they are configured as data with intangibility. Further, each of the electronic books can be provided to multiple users at the same time. Accordingly, books that have not been stocked in nearby existing libraries, or those already on loan, or even the books that are out of print became easily accessible at home. Accordingly, much more electronic books are accessible than at places where the conventional books were found previously.

However, in spite of the increase in accessible electronic books, because the number of the electronic books that can be read by users with a restraint in time is limited, a service of allowing a user to select a specific electronic book which the user prefers among the countless electronic books was demanded.

In the conventional art, as to each of the electronic books, a cover page, a title, an author, a publisher, a category and information on a publication date were provided, but based only on such information, it is difficult to find out whether each of the electronic books would be preferred by the user, and thus there were problems in that the user might be difficult to select an appropriate one among the countless electronic books, or even after selection through consumption of excessive efforts and time, complete-reading may not be made due to the mismatch with the preference of the user.

Thereafter, as another conventional art, information on the number of views was provided for each of the electronic books, but there was a problem of not being able to find out whether the information on the number of views is properly reflecting the number of complete-reading by each user.

In addition, for users with shortage of time to read, even if they wish to read electronic books which suits their own spare time, there is a problem of being unable to find out expected time for the complete-reading of the corresponding electronic books. In order to solve such problems, in the conventional art, the total pages of the corresponding electronic books were provided, but based only on the total pages, it is difficult to accurately estimate the expected time for the complete-reading thereof.

Accordingly, a service related to the electronic books for solving such problems is in need.

SUMMARY OF THE DISCLOSURE

It is an object of the present disclosure to solve all the aforementioned problems.

It is another object of the present disclosure to support a user to easily select an electronic book by additionally providing information on a specific complete-reading probability and information on a specific complete-reading expected time that have not been provided in the conventional art as information on a specific electronic book.

It is still another object of the present disclosure to provide a user interface for supporting the user to retrieve information on an electronic book that is suitable for the user by querying at least part of information on the specific complete-reading probability and information on the specific complete-reading expected time.

In accordance with one aspect of the present disclosure, there is provided a method of providing a user interface for retrieving information on one or more electronic books, comprising steps of: (a) acquiring with a server information on a first electronic book to an n-th electronic book, including information on complete-reading probabilities of each of the first electronic book to the n-th electronic book and information on complete-reading expected times of each of the first electronic book to the n-th electronic book, wherein a first complete-reading probability value to an n-th complete-reading probability value and a first complete-reading expected time value to an n-th complete-reading expected time value corresponding to of each of the first electronic book to the n-th electronic book are acquired by referring to (i) each piece of information on a first reference total page to an n-th reference total page included in each of the first electronic book to the n-th electronic book and (ii) (ii-1) each piece of information on each number of pages read from each of the first electronic book to the n-th electronic book by one or more users among each of the first reference total page to the n-th reference total page and (ii-2) each piece of information on each time taken for the users to read each of the first electronic book to the n-th electronic book, and providing with the server at least one of a first UI element capable of allowing the information on the complete-reading probabilities to be set by a user terminal and a second UI element capable of allowing the information on the complete-reading expected times to be set by the user terminal; and (b) in response to at least one of a specific complete-reading probability range value set through the first UI element and a specific complete-reading expected time range value set through the second UI element inputted by the user terminal which represents a terminal of an information searcher, retrieving with the server information on one or more specific electronic books which are determined as being matched with at least one of the specific complete-reading probability range value and the specific complete-reading expected time range value and then providing the retrieved information on the specific electronic books to the user terminal.

As one example, there is provided a method, wherein, at the step of (a), the server provides, to the user terminal, at least one of the first UI element capable of allowing a first upper limit value and a first lower limit value as queries related to the information on the complete-reading probabilities to be set and the second UI element capable of allowing a second upper limit value and a second lower limit value as queries related to the information on the complete-reading expected times to be set, and wherein, at the step of (b), in response to performing at least one of a process of receiving the first upper limit value and the first lower limit value of the complete-reading probabilities set through the first UI element and a process of receiving the second upper limit value and the second lower limit value of the complete-reading expected times set through the second UI element, the server retrieves information on the specific electronic books, among the first electronic book to the n-th electronic book, which are determined as being matched with at least one of the specific complete-reading probability range value and the specific complete-reading expected time range value by referring to at least one of (i) the first upper limit value and the first lower limit value as the specific complete-reading probability range value and (ii) the second upper limit value and the second lower limit value as the specific complete-reading expected time range value and then provides the retrieved information on the specific electronic books to the user terminal.

As one example, there is provided a method, wherein, at the step of (a), in response to additionally acquiring information on each of a first keyword group to a p-th keyword group, to which each of the first electronic book to the n-th electronic book belongs, the server provides, to the user terminal, a third UI element capable of allowing at least one of the first keyword group to the p-th keyword group to be selected, and wherein, at the step of (b), in response to selecting a specific keyword group through the third UI element, the server provides information on a subset of the specific electronic books corresponding to the specific keyword group to the user terminal.

As one example, there is provided a method, wherein, at the step of (a), the server additionally provides, to the user terminal, at least one of a fourth UI element capable of allowing a first sorting criterion to be set according to the information on the complete-reading probabilities and a fifth UI element capable of allowing a second sorting criterion to be set according to the information on the complete-reading expected times, and wherein, at the step of (b), in response to receiving at least part of a complete-reading probability sorting criterion through the fourth UI element, as the first sorting criterion, and a complete-reading expected time sorting criterion through the fifth UI element, as the second sorting criterion, the server sorts the specific electronic books by referring to at least one of the complete-reading probability sorting criterion and the complete-reading expected time sorting criterion, and thus provides the sorted specific electronic books to the user terminal.

As one example, there is provided a method, further comprising: (c) in response to detecting a selection for a sixth UI element capable of allowing the server to randomly determine at least part of the information on the complete-reading probabilities and the information on the complete-reading expected times, the server determining at least part of information on randomly-determined complete-reading probability and information on randomly-determined complete-reading expected time, retrieving at least part of information on at least one randomly-determined electronic book which is determined as being matched with at least part of the information on the randomly-determined complete-reading probability and the information on the randomly-determined complete-reading expected time among the first electronic book to the n-th electronic book, and providing the retrieved information on the randomly-determined electronic book to the user terminal.

As one example, there is provided a method, wherein, at the step of (a), the server performs at least part of: a process of displaying (i) a bar-type first graphic element and (ii) a first pointer UI for allowing a $(1\_1)$-st pointer and a $(1\_2)$-nd pointer to be positioned on a $(1\_1)$-st point and a $(1\_2)$-nd point respectively on the first graphic element, as the first UI element, through a first region on a screen of the user terminal; and a process of displaying (i) a bar-type second graphic element and (ii) a second pointer UI for allowing a $(2\_1)$-st pointer and a $(2\_2)$-nd pointer to be positioned on a $(2\_1)$-st point and a $(2\_2)$-nd point respectively on the second graphic element, as the second UI element, through a second region on a screen of the user terminal.

As one example, there is provided a method, wherein, at the step of (a), the server provides, to the terminal, at least one of the first UI element capable of allowing the first upper limit value and the first lower limit value as queries related to the information on the complete-reading probabilities to be set and the second UI element capable of allowing the second upper limit value and the second lower limit value as queries related to the information on the complete-reading expected times to be set, and wherein, at the step of (b), the server performs at least part of: (i) (i-1) a process of receiving the first upper limit value as a query related to the information on the complete-reading probabilities by supporting the user terminal to position the $(1\_1)$-st pointer on the $(1\_1)$-st point through the first UI element and (i-2) a process of receiving the first lower limit value as a query related to the information on the complete-reading probabilities by supporting the user terminal to position the $(1\_2)$-nd pointer on the $(1\_2)$-nd point through the first UI element, (ii) (ii-1) a process of receiving the second upper limit value as a query related to the information on the complete-reading expected times by supporting the user terminal to position the $(2\_1)$-st pointer on the $(2\_1)$-st point through the second UI element and (ii-2) a process of receiving the second lower limit value as a query related to the information on the complete-reading expected times by supporting the user terminal to position the $(2\_2)$-nd pointer on the $(2\_2)$-nd point through the second UI element, and wherein the server provides the information on the specific electronic books to the user terminal by referring to at least part of the first upper limit value, the first lower limit value, the second upper limit value and the second lower limit value.

As one example, there is provided a method, wherein, at the step of (a), the server additionally acquires information on a first preference index to information on an n-th preference index for each user by using at least part of: (i) a $(1\_1)$-st calculated value to a $(1\_n)$-th calculated value acquired through a predetermined first algorithm by referring to at least part of the first complete-reading probability value to the n-th complete-reading probability value and the first complete-reading expected time value to the n-th complete-reading expected time value, (ii) a $(2\_1)$-st calculated value to a $(2\_n)$-th calculated value acquired through a predetermined second algorithm by performing summation or weighted summation of at least part of each of degrees of author-similarity, each of degrees of field-similarity and each of degrees of library-similarity, and (iii) a $(3\_1)$-st calculated value to a $(3\_n)$-th calculated value acquired through a predetermined third algorithm by performing summation or weighted summation of at least part of book ranking scores, situational recommendation scores, user participation scores, and wherein the method further comprises a step of: (d) the server supporting the user terminal to display information on a first specific preference index on the specific electronic books selected among the information on the first preference index and the information on the n-th preference index for each of the users through a seventh UI element by referring to the information on the users.

As one example, there is provided a method, further comprising: (e) in response to acquiring an input for adjusting the information on the first specific preference index to information on a second specific preference index through the seventh UI element, the server mapping the information on the first specific preference index and the information on the second specific preference related to the specific electronic books onto the information searcher who has adjusted the information on the first specific preference index to the information on the second specific preference index.

As one example, there is provided a method, wherein, at the step (d), in response to satisfying a first condition that at least part of the specific complete-reading probability range value and the specific complete-reading expected time range value on the specific electronic books are present and a second condition that a cardinal number of electronic books in possession accommodated in a predetermined library managed by the information searcher is more than or equal to a predetermined threshold, the server supports the user terminal to display the information on the first specific preference index on the specific electronic books through the seventh UI element.

In accordance with another aspect of the present disclosure, there is provided a server of providing a user interface for retrieving information on one or more electronic books, comprising: at least one memory that stores instructions; and at least one processor configured to execute the instructions to perform or support another device to perform: processes of (I) acquiring information on a first electronic book to an n-th electronic book, including information on complete-reading probabilities of each of the first electronic book to the n-th electronic book and information on complete-reading expected times of each of the first electronic book to the n-th electronic book, wherein a first complete-reading probability value to an n-th complete-reading probability value and a first complete-reading expected time value to an n-th complete-reading expected time value corresponding to each of the first electronic book to the n-th electronic book are acquired by referring to (i) each piece of information on a first reference total page to an n-th reference total page included in each of the first electronic book to the n-th electronic book and (ii) (ii-1) each piece of information on each number of pages read from each of the first electronic book to the n-th electronic book by one or more users among each of the first reference total page to the n-th reference total page and (ii-2) each piece of information on each time taken for the users to read each of the first electronic book to the n-th electronic book, and providing at least one of a first UI element capable of allowing the information on the complete-reading probabilities to be set by a user terminal and a second UI element capable of allowing the information on the complete-reading expected times to be set by the user terminal; and (II) in response to at least one of a specific complete-reading probability range value set through the first UI element and a specific complete-reading expected time range value set through the second UI element inputted by the user terminal which represents a terminal of an information searcher, retrieving information on one or more specific electronic books which are determined as being matched with at least one of the specific complete-reading probability range value and the specific complete-reading expected time range value and then providing the retrieved information on the specific electronic books to the user terminal.

As one example, there is provided a server, wherein, at the process of (I), the processor provides, to the user terminal, at least one of the first UI element capable of allowing a first upper limit value and a first lower limit value as queries related to the information on the complete-reading probabilities to be set and the second UI element capable of allowing a second upper limit value and a second lower limit value as queries related to the information on the complete-reading expected times to be set, and wherein, at the process of (II), in response to performing at least one of a process of receiving the first upper limit value and the first lower limit value of the complete-reading probabilities set through the first UI element and a process of receiving the second upper limit value and the second lower limit value of the complete-reading expected times set through the second UI element, the processor retrieves information on the specific electronic books, among the first electronic book to the n-th electronic book, which are determined as being matched with at least one of the specific complete-reading probability range value and the specific complete-reading expected time range value by referring to at least one of (i) the first upper limit value and the first lower limit value as the specific complete-reading probability range value and (ii) the second upper limit value and the second lower limit value as the specific complete-reading expected time range value and then provides the retrieved information on the specific electronic books to the user terminal.

As one example, there is provided a server, wherein, at the process of (I), on condition that information on each of a first keyword group to a p-th keyword group, to which each of the first electronic book to the n-th electronic book belongs, has been additionally acquired, the processor provides, to the user terminal, a third UI element capable of allowing at least one of the first keyword group to the p-th keyword group to be selected, and wherein, at the process of (II), in response to selecting a specific keyword group through the third UI element, the processor provides information on a subset of the specific electronic books corresponding to the specific keyword group to the user terminal.

As one example, there is provided a server, wherein, at the process of (I), the processor additionally provides, to the user terminal, at least one of a fourth UI element capable of allowing a first sorting criterion to be set according to the information on the complete-reading probabilities and a fifth UI element capable of allowing a second sorting criterion to be set according to the information on the complete-reading expected times, and wherein, at the process of (II), in response to receiving at least part of a complete-reading probability sorting criterion through the fourth UI element, as the first sorting criterion, and a complete-reading expected time sorting criterion through the fifth UI element, as the second sorting criterion, the processor sorts the specific electronic books by referring to at least one of the complete-reading probability sorting criterion and the complete-reading expected time sorting criterion, and thus provides the sorted specific electronic books to the user terminal.

As one example, there is provided a server, wherein the processor further performs or supports another device to perform a process of: (III) in response to detecting a selection for a sixth UI element capable of allowing the processor to randomly determine at least part of the information on the complete-reading probabilities and the information on the complete-reading expected times, determining at least part of information on randomly-determined complete-reading probability and information on randomly-determined complete-reading expected time, retrieving at least part of information on at least one randomly-determined electronic book which is determined as being matched with at least part of the information on the randomly-determined complete-reading probability and the information on the randomly-determined complete-reading expected time among the first electronic book to the n-th electronic book, and providing the retrieved information on the randomly-determined electronic book to the user terminal.

As one example, there is provided a server, wherein, at the process of (I), the processor performs at least part of: a process of displaying (i) a bar-type first graphic element and (ii) a first pointer UI for allowing a (1_1)-st pointer and a (1_2)-nd pointer to be positioned on a (1_1)-st point and a (1_2)-nd point respectively on the first graphic element, as the first UI element, through a first region on a screen of the user terminal; and a process of displaying (i) a bar-type second graphic element and (ii) a second pointer UI for allowing a (2_1)-st pointer and a (2_2)-nd pointer to be positioned on a (2_1)-st point and a (2_2)-nd point respectively on the second graphic element, as the second UI element, through a second region on a screen of the user terminal.

As one example, there is provided a server, wherein, at the process of (I), the processor provides, to the terminal, at least one of the first UI element capable of allowing the first upper limit value and the first lower limit value as queries related to the information on the complete-reading probabilities to be set and the second UI element capable of allowing the second upper limit value and the second lower limit value as queries related to the information on the complete-reading expected times to be set, and wherein, at the process of (II), the processor performs at least part of: (i) (i-1) a process of receiving the first upper limit value as a query related to the information on the complete-reading probabilities by supporting the user terminal to position the (1_1)-st pointer on the (1_1)-st point through the first UI element and (i-2) a process of receiving the first lower limit value as a query related to the information on the complete-reading probabilities by supporting the user terminal to position the (1_2)-nd pointer on the (1_2)-nd point through the first UI element, (ii) (ii-1) a process of receiving the second upper limit value as a query related to the information on the complete-reading expected times by supporting the user terminal to position the (2_1)-st pointer on the (2_1)-st point through the second UI element and (ii-2) a process of receiving the second lower limit value as a query related to the information on the complete-reading expected times by supporting the user terminal to position the (2_2)-nd pointer on the (2_2)-nd point through the second UI element, and wherein the processor provides the information on the specific electronic books to the user terminal by referring to at least part of the first upper limit value, the first lower limit value, the second upper limit value and the second lower limit value.

As one example, there is provided a server, at the process of (I), the processor additionally acquires information on a first preference index to information on an n-th preference index for each user by using at least part of: (i) a (1_1)-st calculated value to a (1_n)-th calculated value acquired through a predetermined first algorithm by referring to at least part of the first complete-reading probability value to the n-th complete-reading probability value and the first complete-reading expected time value to the n-th complete-reading expected time value, (ii) a (2_1)-st calculated value to a (2_n)-th calculated value acquired through a predetermined second algorithm by performing summation or weighted summation of at least part of each of degrees of author-similarity, each of degrees of field-similarity and each of degrees of library-similarity, and (iii) a (3_1)-st calculated value to a (3_n)-th calculated value acquired through a predetermined third algorithm by performing summation or weighted summation of at least part of book ranking scores, situational recommendation scores, user participation scores, and wherein the processor further performs or supports another device to perform a process of: (IV) supporting the user terminal to display information on a first specific preference index on the specific electronic books selected among the information on the first preference index and the information on the n-th preference index for each of the users through a seventh UI element by referring to the information on the users.

As one example, there is provided a server, wherein, the processor further performs or supports another device to perform a process of: (V) in response to acquiring an input for adjusting the information on the first specific preference index to information on a second specific preference index through the seventh UI element, mapping the information on the first specific preference index and the information on the second specific preference related to the specific electronic books onto the information searcher who has adjusted the information on the first specific preference index to the information on the second specific preference index.

As one example, there is provided a server, wherein, at the process (IV), in response to satisfying a first condition that at least part of the specific complete-reading probability range value and the specific complete-reading expected time range value on the specific electronic books are present and a second condition that a cardinal number of electronic books in possession accommodated in a predetermined library managed by the information searcher is more than or equal to a predetermined threshold, the processor supports the user terminal to display the information on the first specific preference index on the specific electronic books through the seventh UI element.

BRIEF DESCRIPTION OF THE DRAWINGS

The accompanying drawings used to explain example embodiments of the present disclosure are only part of example embodiments of the present disclosure and other drawings can be obtained based on the drawings by those skilled in the art of the present disclosure without inventive work.

FIG. 2 is a drawing representing a flowchart for providing information on the electronic books in accordance with one example embodiment of the present invention.

FIG. 4 is a drawing representing a flowchart for providing a user interface capable of allowing a user to retrieve information on the specific electronic book in accordance with another example embodiment of the present invention.

FIG. 6 is a drawing representing an example of information returned from a user query based on user selections for complete-reading probability, complete-reading expected time, and keyword groups retrieved through the user interface in accordance with another example embodiment of the present invention.

FIG. 7 is a drawing representing an example of the user interface which provides information on a first preference index for the specific electronic book and allows the user to adjust information on the first preference index to be a second preference index in accordance with another example embodiment of the present invention.

DETAILED DESCRIPTION OF THE PREFERRED EMBODIMENTS

Figure 1:
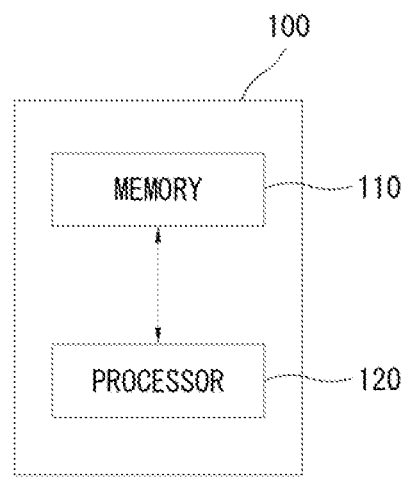
FIG. 1 is a drawing representing a server for providing a service related to electronic books in accordance with one example embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

To allow those skilled in the art to the present disclosure to be carried out easily, the example embodiments of the present disclosure by referring to attached drawings will be explained in detail as shown below.

FIG. 1 is a drawing representing a server 100 for providing a service related to electronic books in accordance with one example embodiment of the present invention. Herein, the service related to the electronic books may mean a service of providing information on the electronic books in accordance with one example embodiment of the present invention, or may mean a service of providing a user interface for retrieving information on the electronic books in accordance with another example embodiment of the present invention.

A memory 110 of the server 100 may store instructions to be performed by a processor 120 of the server 100. Herein, the instructions are codes generated for the purpose of enabling the server 100 to function in a specific manner. Further, the instructions may perform processes for executing functions explained in the present disclosure.

In addition, the processor 120 of the server 100 may include hardware configurations of MPU (Micro Processing Unit) or CPU (Central Processing Unit), cache memory, data bus, etc. Additionally, the computing device may further include OS and software configuration of applications that achieve specific purposes.

Moreover, the server 100 may be interlocked with a database (not shown). Herein, the database may include, but are not limited to, storage media of at least one type media such as flash memory type, hard disk type, multimedia card micro type, memory of card type (for example, SD or XD memory), RAM (Random Access Memory), SRAM (Static Random Access Memory), ROM (Read-Only Memory), EEPROM (Electrically Erasable Programmable Read-Only Memory), PROM (Programmable Read-Only Memory), magnetic memory, magnetic disk, optical disk, and all media capable of storing data. Moreover, the database may be installed separately from the server 100, or otherwise may be installed inside the server 100 and transmit data or record received data, and may be implemented in separation into two or more databases unlike as illustrated, and this may vary depend on working conditions.

FIG. 2 is a drawing representing a flowchart for providing information on the electronic books in accordance with one example embodiment of the present invention.

Referring to FIG. 2, the server 100 may acquire (i) information on a first reference read page to an n-th reference read page, each of which is read by one or more users among each of a first reference total page to an n-th reference total page included in each of a first electronic book to an n-th electronic book and (ii) information on a first required time to an n-th required time, each of which is time taken for the users to read each of the first reference read page to the n-th reference read page at a step of S210; and may manage and update them in the database.

For example, if a total page contained in the first electronic book is 300 pages, where the users who read the first electronic book read 200 pages in average of the first electronic book, information on the first reference read page may be acquired as 200 pages. Obviously, the average above is one example and information on the first reference read page can be calculated by other various methods.

In addition, if time spent for the users to read 200 pages of the first electronic book was 1 hour in average, information on the first read time can be acquired as 1 hour. Obviously, the average above is one example and information on the first read time can be calculated by other various methods.

Herein, the first reference total page to the n-th reference total page may mean a first original total page to an n-th original total page or may mean a first standardized total page to an n-th standardized total page. Herein, "original total page" above represents a total page of a published version of an electronic book published by an initial publisher without converting the published version according to a predetermined standardized formatting criterion. Further, "standardized total page" above represents a total page of a converted version of an electronic book by converting the published version into the converted version according to the predetermined standardized formatting criterion set by the server or the like.

In a similar way, the first reference read page to the n-th reference read page also may mean a first original read page to an n-th original read page each of which is read by at least one user among each of the first original total page to the n-th original total page without a predetermined standardized formatting criterion, or may mean a first standardized read page to an n-th standardized read page each of which is read by at least one user among each of the first standardized total page to the n-th standardized total page which is a total page acquired by converting the published version into the converted version according to the predetermined standardized formatting criterion.

However, a ratio of the original read page read to the original total page of an electronic book and a ratio of the standardized read page read to the standardized total page of the same electronic book would be same with each other, and thus a first reference read time to an n-th reference read time shall be called as the first read time to the n-th read time without the need for the word "reference".

Meanwhile, the server 100, at the step S210, may additionally acquire at least one piece of: (iii) information on similar users which represents information on a first user to an m-th user who read the specific electronic book (which may be at least one of the first electronic book to the n-th electronic book), (iv) information on similar electronic books which represents a first book of interest to an m-th book of interest, wherein the first book of interest to the m-th book of interest corresponding to the first user to the m-th user are electronic books other than the specific electronic book, (v) information on each of degrees of user-similarity between a specific user and each of the first user to the m-th user, and (vi) information on each of degrees of book-similarity between a specific book of interest of the specific user and each of the first book of interest to the m-th book of interest, and may manage and update them in a predetermined database.

For example, the server 100 may acquire (iii) information on similar users such as genders and ages of the first user to the m-th user who read the specific electronic book, (iv) information on similar electronic books such as an author and a category for an electronic book (hereinafter, referred to as "electronic book of interest") other than the specific electronic book among electronic books read or being read or to be read (hereinafter, referred to as "corresponding electronic book"), (v) information on each of degrees of user-similarity which is each of degrees of similarity such as gender, age between the specific user and each of the first user to the m-th user, (vi) information on each of degrees of book-similarity between a specific author (or a specific category) of a specific book of interest and each of authors (or each of categories) of the first book of interest to the m-th book of interest.

Herein, the "specific user" is a man or a woman who tries to retrieve an electronic book, e.g., the specific electronic book, by using the predetermined database. Thus, the meaning of the specific user is different from the "users" who contributed to the establishment of the predetermined database. For reference, in order to clarify the meaning of the specific user, the "specific user" may be replaced with "information searcher" as the case may be.

Meanwhile, the server 100, at the step S210, may additionally acquire information on a first another reference total page corresponding to a first another electronic book which belongs to a same category as the specific electronic book, information on a first another reference read page which is read among the first another reference total page, and information on a first another read time which is time taken to read the first another reference read page, and may manage and update them in the database. Although it was already mentioned above that information on the total pages, information on the read pages and information on the read times, etc. of the first electronic book to the n-th electronic book were acquired and updated, it can be considered to have explained again by emphasizing further that information on some parts of other electronic books may be grouped on the basis of the specific electronic book.

For example, on the assumption that the specific electronic book is an electronic book in the field of novel, information on a reference total page, information on a reference read page and information on read time of the first another electronic book which belongs to the field of novel are additionally managed and updated.

In addition, as explained above, the first another reference total page may mean a first another original total page or a first another standardized total page as mentioned above.

Similarly, the first another reference read page may also mean a first another original read page or a first another standardized read page as mentioned above.

Meanwhile, the server 100, at the step S210, may additionally acquire information on a second another reference total page corresponding to a second another electronic book owned by another user who belongs to a same category as the specific user, information on a second another reference read page which is read among the second another reference total page, and information on a second another read time which is time taken to read the second another reference read page, and may manage and update them in the database. Again, although it was already mentioned above that information on the total pages, information on read pages and information on read times, etc. of the first electronic book to the n-th electronic book were acquired and updated, it can be considered to have explained again by emphasizing further that information on some parts of other electronic books may be grouped on the basis of the specific electronic book.

For example, said another user who belongs to the same category as the specific user may mean a user with similar gender, age or with a similar preference for an electronic book of interest, and thus it refers to additional acquisition of information on a reference total page, information on a reference read page and information on a read time of an electronic book corresponding to said another user as such.

For a specific example, it can be considered that information on a reference total page, information on a reference read page and information on a read time of an electronic book read by male users in teens who enjoy novels may be acquired.

In addition, as explained above, the second another reference total page may mean a second another original total page or a second another standardized total page.

Similarly, the second another reference read page may also mean a second another original read page or a second another standardized read page.

Meanwhile, the server 100, at the step of S210, may additionally acquire information on a first array to information on an n-th array each of which includes at least one of font size, font, space between letters, picture size, number of pictures, page margin and the like corresponding to each of the first electronic book to the n-th electronic book, and manage them in the database.

For a specific example, for the first electronic book, it can be considered that information on the first array including the font size of 12 pt, font of Arial, space between letters of 32 pt, 15 pictures occupying 20% in area from page 100 to page 150 is acquired. For this, information on the distribution of the pictures for each page may also be acquired.

In the state of various information being managed in the database as above, in response to detecting that the specific electronic book is selected by the specific user or by a predetermined algorithm, the server (i) acquires at least part of information on a specific complete-reading probability and information on a specific complete-reading expected time for the specific electronic book by referring to (1) information on a specific reference total page corresponding to the specific electronic book and (2) at least part of information on a specific reference read page which is a page read by the users among the specific reference total page and information on a specific required time which is time taken by the users to read the specific reference read page and (ii) matches at least part of the information on the specific complete-reading probability and the information on the specific complete-reading expected time with the specific electronic book at a step of S220.

Acquiring at least part of the information on the specific complete-reading probability and the information on the specific complete-reading expected time for the specific electronic book may be embodied through a case of retrieving at the step of S220 the information on the specific complete-reading probability and the information on the specific complete-reading expected time from the database built at the step of S210 in advance or through a case of calculating at the step of S220 the information on the specific complete-reading probability and the information on the specific complete-reading expected time irrespective of whether the information on the specific complete-reading probability and the information on the specific complete-reading expected time are stored in the database built at the step of S210. In the case of the former, there is an advantage of providing the information on the specific complete-reading probability and the information on the specific complete-reading expected time quickly by using the database built in advance, and in the case of the latter, there is an advantage of providing the information on the specific complete-reading probability and the information on the specific complete-reading expected time with a small amount of operations since the calculations of the information on the specific complete-reading probability and the information on the specific complete-reading expected time are required only when necessary.

Meanwhile, the predetermined database (which is referred to retrieve the information on the specific complete-reading probability and the information on the specific complete-reading expected time) may have been established by the contribution of all the users or by the contribution of at least part of the users. However, for the convenience of explanation, we do not differentiate therebetween as the case may be.

Herein, as an example of the operations for retrieving or calculating the information on the specific complete-reading probability, the server 100 performs a process of acquiring a first cardinal number of a first part of the users whose specific reference read pages are equal to or greater than a first threshold, a process of acquiring a second cardinal number of a second part of the users whose specific reference read pages are equal to or greater than a second threshold and a process of acquiring the information on the specific complete-reading probability by referring to the first cardinal number and the second cardinal number. Herein, the second threshold is less than the first threshold.

For a specific example, when the first threshold is 70% and the second threshold is 20%, the server may acquire information on the specific complete-reading probability by calculating a ratio of the first cardinal number to the second cardinal number.

That is, among 300 pages as the specific reference total page, if the first cardinal number of the first part of the users who read 210 pages or more is 1,000 and the second cardinal number of the second part of the users who read 60 pages or more is 10,000, the information on the specific complete-reading probability can be determined as 10%.

In addition, as an example of the operations for retrieving or calculating the information on the specific complete-reading expected time, the server 100 performs a process of acquiring a third cardinal number of a third part of the users whose specific reference read pages are equal to or greater than a third threshold, and a process of acquiring the information on the specific complete-reading expected time by referring to the specific reference total page and time required per page for the specific reference read page of the third part of the users.

For a specific example, when the third threshold is 70%, the server 100 may acquire information on the specific complete-reading expected time by performing processes of (i) acquiring the third cardinal number, i.e., the number of the third part of the users whose specific reference read pages are equal to or greater than the third threshold, (ii) calculating time required per page for the third cardinal number, and (iii) multiplying the specific reference total page to the time required per page for the third cardinal number.

That is, if one person among the third cardinal number read 200 pages, i.e., the specific reference read page, among 300 pages, i.e., the specific reference total page, in 300 minutes, the time required per page is 1.5 minutes, and accordingly, the information on the complete-reading expected time can be calculated as 450 minutes for said one person among the third cardinal number by multiplying the time required per page, i.e., 1.5 minutes, to the specific reference total page, i.e., 300 pages. As another example, depending on the case, it would be possible to manage the concept of the information on the complete-reading expected time, not by the expected time for reading the specific reference total page but by the expected time for reading the specific reference read page. Though such processes, the information on the specific complete-reading expected time can be calculated by an average value of each of pieces of the information on the complete-reading expected time for the third part of the users or by another value acquired through another operation.

Meanwhile, depending on the case, at the step of S220, the server 100 may perform processes of (1) acquiring at least part of the information on the specific complete-reading probability and the information on the specific complete-reading expected time for the specific electronic book by referring to (i) the information on the specific reference total page corresponding to the specific electronic book and (ii) at least part of the information on the specific reference read page which is the page read by the users among the specific reference total page and the information on the specific required time which is the time taken by the users to read the specific reference read page, (2) (2-1) adjusting at least part of the information on the specific complete-reading probability and the information on the specific complete-reading expected time by referring to at least part of the information on the similar users, the information on the similar electronic books, the information on the degrees of the user-similarity, and the information on the degrees of the book-similarity and thus (2-2) acquiring at least part of information on a first specific adjusted complete-reading probability and information on a first specific adjusted complete-reading expected time, and (3) providing the specific electronic book onto which at least part of the information on the first specific adjusted complete-reading probability and the information on the first specific adjusted complete-reading expected time are mapped.

As a specific example, at the step S210, when the server adjusts the information on the specific complete-reading probability by referring to at least part of (iii) the information on the user-similarity such as gender and age, (iv) the information on the book-similarity such as author and category of the book of interest, (v) the information on each of the degrees of the user-similarity which is each of degrees of similarity such as gender, age, (vi) the information on each of the degrees of the book-similarity such as author and category, the server may put weight on a specific cardinal number of users with similar gender and age to the specific user and then calculate the information on the first specific adjusted complete-reading probability by using the weighted specific cardinal number.

Meanwhile, as another example, as the step S220, the server 100 may perform processes of (1) acquiring at least part of the information on the specific complete-reading probability and the information on the specific complete-reading expected time for the specific electronic book by referring to (i) the information on the specific reference total page corresponding to the specific electronic book and (ii) at least part of the information on the specific reference read page which is the page read by the users among the specific reference total page and the information on the specific required time which is the time taken by the users to read the specific reference read page, (2) (2-1) adjusting at least part of the information on the specific complete-reading probability and the information on the specific complete-reading expected time by referring to information on a specific array, wherein the information on the specific array includes at least one of font size, font, space between letters, picture size, number of pictures and page margin and thus (2-2) acquiring at least part of information on a second specific adjusted complete-reading probability and information on a second specific adjusted complete-reading expected time, and (3) providing the specific electronic book onto which at least part of the information on the second specific adjusted complete-reading probability and the information on the second specific adjusted complete-reading expected time are mapped.

This may lead to an effect of providing more accurate information to the users since it considers various abnormal cases, e.g., a case in which a specific portion of the electronic book includes pictures with a 80% of pp. 101~200, or another case in which a size of letters of pp. 31~40 is two times of a size of letters of the other pages.

Hereinafter, by referring to FIG. 3, it is explained as to how the information on the specific complete-reading probability and the information on the specific complete-reading expected time for the specific electronic book are provided.

Figure 3:
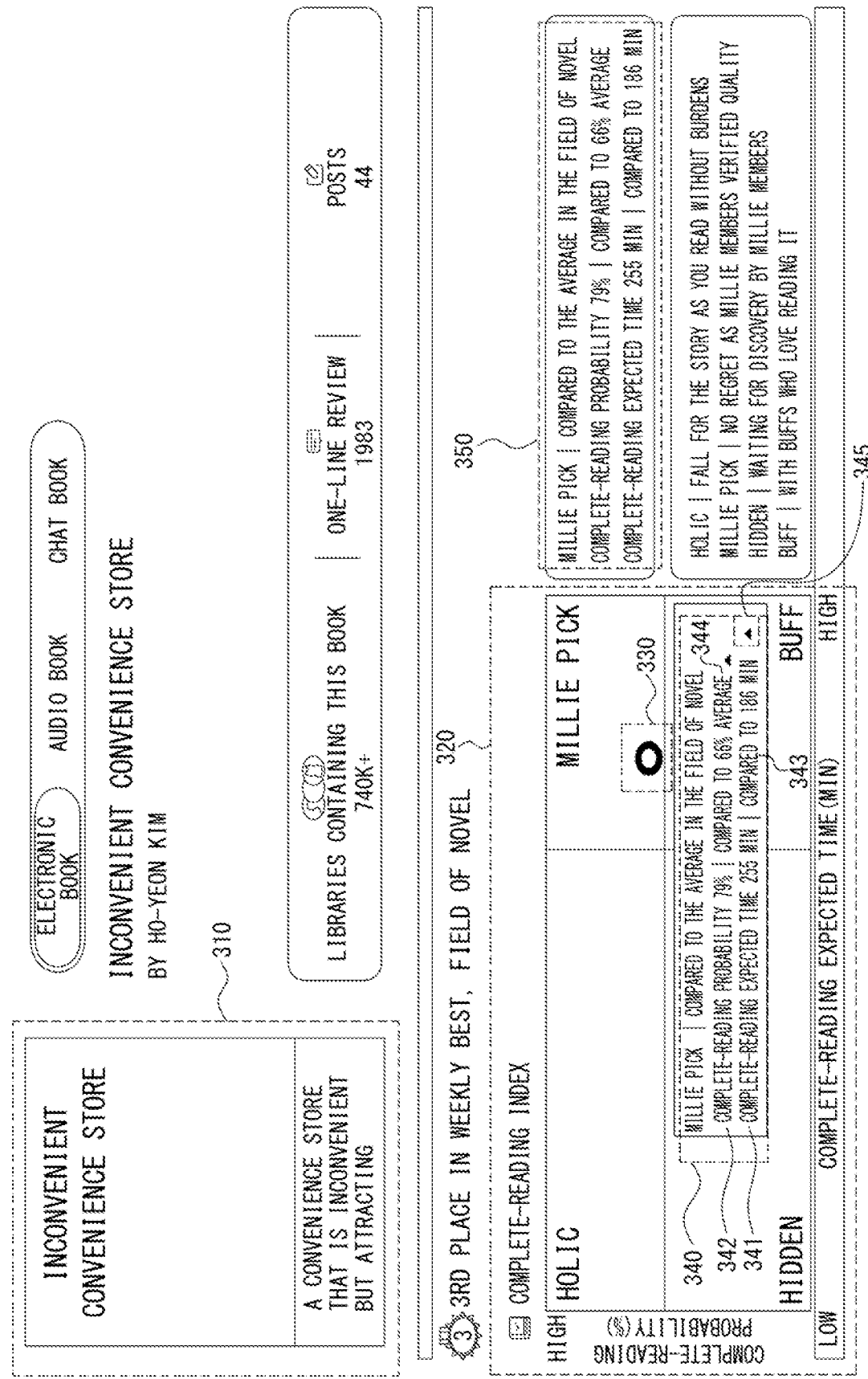
FIG. 3 is a drawing representing an example of the user interface that provides information on a specific complete-reading probability and information on a specific complete-reading expected time visualized through a template and matched with a specific electronic book in accordance with one example embodiment of the present invention.

FIG. 3 is a drawing representing an example of the user interface that provides the information on the complete-reading probability and the information on the complete-reading expected time visualized through a template 320 and matched with a specific electronic book 310 in accordance with one example embodiment of the present invention.

Referring to FIG. 3, the server 100 may provide, to a user terminal of the specific user, the template 320 in which the information on the specific complete-reading probability for the specific electronic book 310 is mapped onto a first coordinate value of a first axis, and/or in which the information on the specific complete-reading expected time for the specific electronic book 310 is mapped onto a second coordinate value of a second axis.

For example, it can be understood that, in FIG. 3, the information on the specific complete-reading expected time is mapped onto the coordinate value of the x axis, and the information on the specific complete-reading probability is mapped onto the coordinate value of the y axis. As a result, the coordinate 330 is marked as shown in FIG. 3.

In addition, the template 320 may be configured as any one of (i) a first mode template in which a (1_1)-st region and a (1_2)-nd region are provided based on at least one first type threshold related to the first axis, (ii) a second mode template in which at least (2_1)-st region and a (2_2)-nd region are provided based on at least one second type threshold related to the second axis, and (iii) a third mode template in which the (1_1)-st region and the (1_2)-nd region are provided based on the first type threshold and the (2_1)-st region and the (2_2)-nd region are provided based on the second type threshold.

For example, FIG. 3 shows an example of the third mode template 320. Herein, 186 minutes corresponding to information on a first another complete-reading expected time 343 to be explained hereinafter is referred to as the first type threshold, and 66% corresponding to information on a first another complete-reading probability 344 to be explained hereinafter is referred to as the second type threshold.

Meanwhile, the meaning of "user terminal" is a terminal of the information searcher.

Meanwhile, the server 100 may map at least part of the first coordinate value and the second coordinate value corresponding to the information on the specific complete-reading probability and the information on the specific complete-reading expected time onto the template 320 by referring to a result of comparison between the first type threshold and the first coordinate and/or a result of comparison between the second type threshold and the second coordinate.

For example, in the third mode template 320 of FIG. 3, the specific complete-reading expected time 341 is 255 minutes, which is greater than 186 minutes corresponding to the first another complete-reading expected time 343 serving as the first type threshold, and thus should be mapped onto the (1_2)-nd region, and the specific complete-reading probability 342 is 79%, which is greater than 66% corresponding to the first another complete-reading expected probability 344 serving as the second type threshold, and thus should be mapped onto the (2_2)-nd region. As a result, it can be understood that they are displayed in the top right region (marked in a circle) which is an intersection of the (1_2)-nd region and the (2_2)-nd region.

Meanwhile, the server 100 may provide an additional template for indicating at least part of the information on the specific complete-reading probability and the information on the specific complete-reading expected time near at least part of the first coordinate value and the second coordinate value.

For example, in case a user places a cursor on the coordinate 330 mapped onto the template 320, the additional template 340 may be provided around the coordinate 330, or the additional template 350 may be separately provided next to the template 320.

Meanwhile, the server 100 may additionally provide at least part of the information on the first another complete-reading probability and the information on the first another complete-reading expected time determined by referring to the information on the first another reference total page and at least part of the information on the first another reference read page and the information on the first another read time through the additional templates 340, 350 to the user terminal.

For example, in FIG. 3, 66% corresponding to the information on the first another complete-reading probability 344 (which is information on complete-reading probability on electronic books belonging to the same category as the field of novel, i.e., a category of the specific electronic book 310) and 186 minutes corresponding to the information on the first another complete-reading expected time 343 (which is information on complete-reading expected time on the electronic books belonging to the same category as the field of novel, i.e., the category of the specific electronic book 310) are provided to the user terminal through the additional template 340.

Meanwhile, the server 100 may additionally provide (i) information on a first complete-reading probability comparison acquired by comparing the information on the specific complete-reading probability and the information on the first another complete-reading probability and (ii) information on a first complete-reading time comparison acquired by comparing the information on the specific complete-reading expected time and the information on the first another complete-reading expected time to the user terminal through the additional template.

For example, in FIG. 3, 79%, i.e., the information on the specific complete-reading probability, and 66%, i.e., the information on the first another complete-reading probability, are compared to thereby indicate the information on the specific complete-reading probability as an upward arrow to show that it is greater, or 255 minutes, i.e., the information on the specific complete-reading expected time, and 186 minutes, i.e., the information on the first another complete-reading expected time, are compared to thereby indicate the information on the specific complete-reading expected time as an upward arrow 345 to show that it is greater.

Meanwhile, the server 100 may additionally provide at least part of the information on the second another complete-reading probability and the information on the second another complete-reading expected time determined by referring to the information on the second another reference total page and at least part of the information on the second another reference read page and the information on the second another read time to the user terminal through the additional template.

The information on the second another complete-reading probability and the information on the second another complete-reading expected time may be provided in the similar manner as the case of providing the information on the first another reference complete-reading probability and information on the first another reference complete-reading expected time, but unlike the information on the first another reference complete-reading probability and information on the first another reference complete-reading expected time being acquired by targeting electronic books of the same category as the specific electronic book, the information on the second another complete-reading probability and the information on the second another complete-reading expected time are acquired by targeting users of the same category as the specific user. However, both cases are similar, and thus its explanation is omitted.

FIG. 4 is a drawing representing a flowchart for providing a user interface capable of allowing a user to retrieve information on a specific electronic book in accordance with another example embodiment of the present invention.

By referring to FIG. 4, on condition that at least part of information on complete-reading probabilities including information on a first complete-reading probability to information on an n-th complete-reading probability and information on complete-reading expected times including information on a first complete-reading expected time to information on an n-th complete-reading expected time have been acquired by referring to (i) each piece of information on a first reference total page to an n-th reference total page included in each of a first electronic book to an n-th electronic book and (ii) (ii-1) each piece of information on a first reference read page to an n-th reference read page, each of which is read by one or more users among each of the first reference total page to the n-th reference total page and (ii-2) each piece of information on a first required time to an n-th required time, each of which is time taken for the users to read each of the first reference read page to the n-th reference read page, the server 100 may provide at least part of a first UI element capable of allowing the information on the complete-reading probabilities to be set and a second UI element capable of allowing the information on the complete-reading expected times to be set at a step of S410.

Herein, the information on the complete-reading probabilities and the information on the complete-reading expected times should be understood as variables such as X, Y, etc., while the information on the first complete-reading probability to the information on the n-th complete-reading probability and the information on the first complete-reading expected time to the information on the n-th complete-reading expected time should be understood as specific values such as X=x0, Y=y1, etc. Further, the information on the specific complete-reading probability and the specific complete-reading expected time should be understood as specific range of values. However, in order to clarify these meanings in Claims, the information on the first complete-reading probability to the information on the n-th complete-reading probability, the information on the first complete-reading expected time to the information on the n-th complete-reading expected time, the specific complete-reading probability and the specific complete-reading expected time can be respectively replaced with the first complete-reading probability value to the n-th complete-reading probability value, the first complete-reading expected time value to the n-th complete-reading expected time value, the specific complete-reading probability range value and the specific complete-reading expected time range value, as the case may be.

Figure 5:
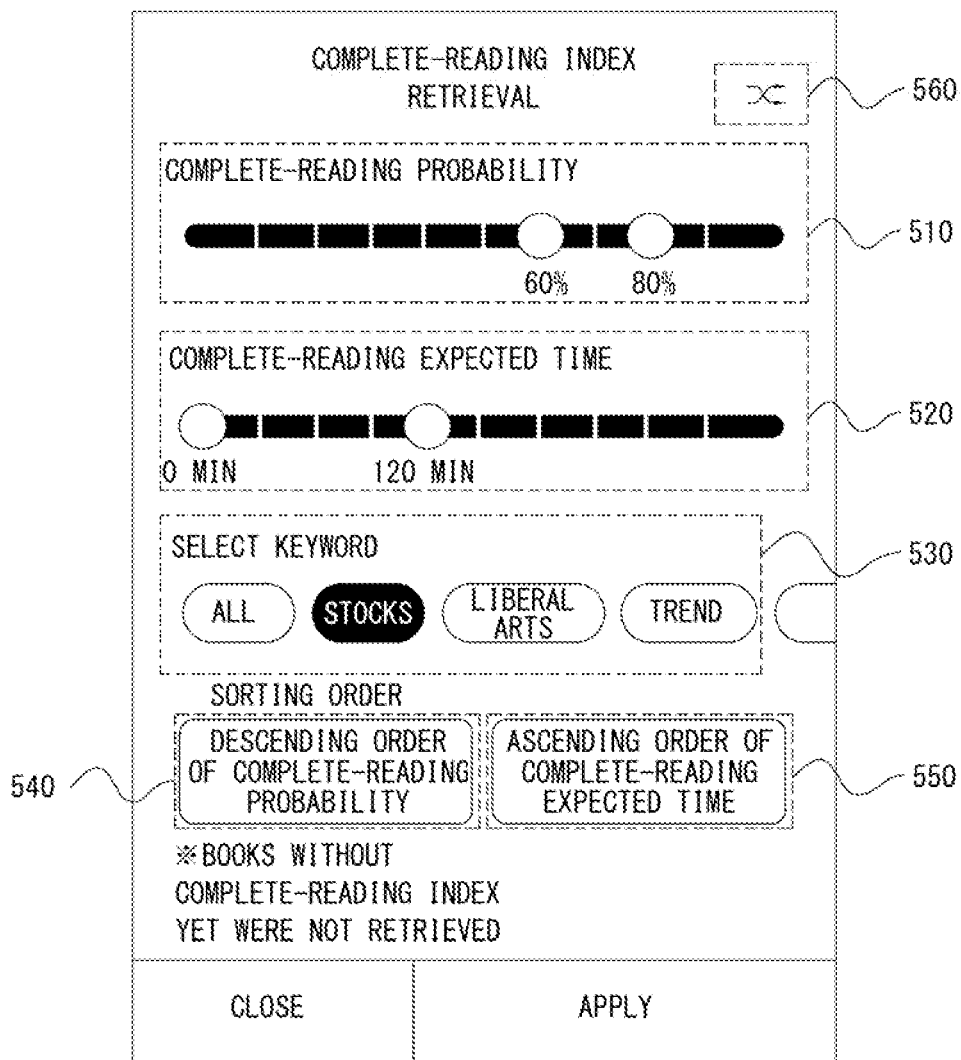
FIG. 5 is a drawing representing an example of the user interface supporting the user to retrieve the specific electronic book through information on the specific complete-reading probability and the specific complete-reading expected time, etc. in accordance with another example embodiment of the present invention.

A specific example for S410 as above shall be explained with a reference to FIG. 5.

FIG. 5 is a drawing representing an example of the user interface supporting the user to retrieve at least one specific electronic book through information on a specific complete-reading probability and a specific complete-reading expected time, etc. in accordance with another example embodiment of the present invention.

Referring to FIG. 5, for one example of the first UI element 510 and the second UI element 520 being provided, the server 100 may provide, to the user terminal, at least part of the first UI element 510 capable of allowing at least part of a first upper limit value and a first lower limit value related to the information on the complete-reading probabilities to be set and at least part of the second UI element 520 capable of allowing at least part of a second upper limit value and a second lower limit value related to the information on the complete-reading expected times to be set.

For a specific example, referring to FIG. 5, it is shown that through the first UI element 510 provided to the user terminal, the first upper limit value is set as 80%, the first lower limit value is set as 60%, and through the second UI element 520, the second upper limit value is set as 120 minutes, the second lower limit value is set as 0 minutes.

In addition, referring to FIG. 5, on condition that information on each of a first keyword group to a p-th keyword group, to which each of the first electronic book to the n-th electronic book belongs, has been additionally acquired, the server 100 may further provide, to the user terminal, a third UI element 530 capable of allowing at least one of the first keyword group to the p-th keyword group to be selected. Herein, in case p and n are the same, which is a special case, each electronic book and each keyword group may be mapped according to 1:1 relationship.

For example, in response to detecting that the first electronic book belongs to a keyword group of economy and English, that the second electronic book belongs to a keyword group of stocks, English and trend, and that the third electronic book belongs to a keyword group of beauty, fashion and trend, the third UI element 530 capable of allowing the user to select a keyword group, etc. among economy, stocks, English, trend, beauty, and fashion. Such the third UI element 530 would allow the user to set a query for retrieving the specific electronic book by using at least part of the first UI element 510 and the second UI element 520.

In addition, referring to FIG. 5, the server 100, at the step S410, may additionally provide, to the user terminal, at least part of a fourth UI element 540 capable of allowing a first sorting criterion to be set according to the information on the complete-reading probabilities and a fifth UI element 550 capable of allowing a second sorting criterion to be set according to the information on the complete-reading expected times. Such the fourth UI element 540 and/or the fifth UI element 550 can be used for sorting the result of retrieval of electronic books.

For example, the server 100 may provide, to the user terminal, the fourth UI element 540 capable of setting the sorting reference in the descending order of the information on the complete-reading probabilities, and the fifth UI element 550 capable of setting the sorting reference in the ascending order of the information on the complete-reading expected times.

As more specific example, the server 100, at the step of S410, may provide at least part of the first UI element 510 and the second UI element 520 to the user terminal as follows.

Referring to FIG. 5 again, the server 100 may perform at least part of (1) a process of displaying (i) a bar-type first graphic element and (ii) a first pointer UI for allowing a (1_1)-st pointer and a (1_2)-nd pointer to be positioned on a (1_1)-st point and a (1_2)-nd point respectively on the first graphic element, as the first UI element 510, through a first region on a screen of the user terminal and (2) a process of displaying (i) a bar-type second graphic element and (ii) a second pointer UI for allowing a (2_1)-st pointer and a (2_2)-nd pointer to be positioned on a (2_1)-st point and a (2_2)-nd point respectively on the second graphic element, as the second UI element 520, through a second region on a screen of the user terminal.

Meanwhile, in response to detecting that at least part of the information on the specific complete-reading probability set through the first UI element 510 and the information on the specific complete-reading expected time set through the second UI element 520 are inputted by the user terminal, the server 100 may retrieve information on the specific electronic book which is determined as being matched with at least part of the information on the specific complete-reading probability and the information on the specific complete-reading expected time and then provide the retrieved information on the specific electronic book to the user terminal at a step of S420.

For example, in response to performing at least one of a process of receiving at least part of the first upper limit value and the first lower limit value set through the first UI element 510 and a process of receiving at least part of the second upper limit value and the second lower limit value set through the second UI element 520, the server 100 retrieves information on the specific electronic book, among the first electronic book to the n-th electronic book, which is determined as being matched with at least part of the information on the specific complete-reading probability and the information on the specific complete-reading expected time by referring to at least either of (i) at least part of the first upper limit value and the first lower limit value as the information on the specific complete-reading probability and (ii) at least part of the second upper limit value and the second lower limit value as the information on the specific complete-reading expected time and then provides the retrieved information on the specific electronic book to the user terminal.

In detail, the server 100 receives at least part of the first upper limit value and the first lower limit value as queries related to the information on the complete-reading probabilities and receives at least part of the second upper limit value and the second lower limit value as queries related to the information on the complete-reading expected times. However, for the convenience of explanation, the expression such as receiving at least part of the first upper limit value and the first lower limit value as the information on the complete-reading probabilities and receiving at least part of the second upper limit value and the second lower limit value as the information on the specific complete-reading expected times may be used as the case may be.

For a specific example, in response to detecting that the first upper limit value is set as 80% and the first lower limit value is set as 60% through the first UI element 510, and the second upper limit value is set as 120 minutes and the second lower limit value is set as 0 minutes through the second UI element, the server provides, to the user terminal, the retrieved information on the at least one specific electronic book which is matched with 60% to 80% of the information on the specific complete-reading probability and 0 to 120 minutes of the information on the specific complete-reading expected time.

Meanwhile, at the step S420, in response to selecting a specific keyword group through the third UI element 530, the server 100 may provide information on a subset of the specific electronic book corresponding to the specific keyword group among the at least one specific electronic book to the user terminal.

Meanwhile, referring to FIG. 5 again, the server 100 may detect a selection for a sixth UI element 560 capable of allowing the server to automatically determine at least part of the information on the complete-reading probabilities and the information on the complete-reading expected times, and in this case, the server 100 may determine at least part of information on auto-determined complete-reading probability and information on auto-determined complete-reading expected time, retrieve at least part of information on at least one auto-determined electronic book which is determined as being matched with at least part of the information on the auto-determined complete-reading probability and the information on the auto-determined complete-reading expected time among the first electronic book to the n-th electronic book, and provide the retrieved information on the auto-determined electronic book to the user terminal.

FIG. 6 is a drawing representing an example of information returned from a user query based on user selections for complete-reading probability, complete-reading expected time, and keyword groups retrieved through the user interface in accordance with another example embodiment of the present invention.

Referring to FIG. 6, it can be understood that results 610 of retrieval acquired by using a query set as in FIG. 5 are shown. Further, in the case of intending to set another query through FIG. 5, a button 620 for returning to the user interface of FIG. 5 is shown as in FIG. 6. In addition, it can be understood that for each specific electronic book included in the retrieved information 610, information on each complete-reading probability and information on each complete expected time are indicated.

In case one electronic book is selected among many specific electronic books included in the retrieved information 610 of FIG. 6, information on a preference index, etc.

of the corresponding electronic book may be provided and adjusted, and it shall be explained hereinafter with a reference to FIG. 7.

FIG. 7 is a drawing representing an example of the user interface which provides information on a first preference index for the specific electronic book and allows the user to adjust information on the first preference index to be a second preference index in accordance with another example embodiment of the present invention.

Referring to FIG. 7, it can be understood that information on the first preference index on the corresponding electronic book is indicated in a predetermined region 710, and at the same time, it is indicated as a pointer 721 included in a seventh UI element 720, and by adjusting a position of the pointer 721 of the seventh UI element 720, the information on the first preference index can be adjusted. Such adjusted information on the preference index can be a so-called information on the second preference index, and through a send button 730, information on the second preference index can be transmitted to the server 100.

The server 100 may manage the mapping relationship among the information on the first specific preference index, the information on the second specific preference index, the specific electronic book, and a specific user who adjusted the preference index. As another example, it may provide another preference index acquired by applying respective weights on the first specific preference index and the second specific preference index.

Herein, as a prerequisite for providing information on a preference index as in FIG. 7, the server 100 may detect whether at least one predetermined condition is satisfied. For example, if a first condition that at least part of the information on the specific complete-reading probability and the information on the specific complete-reading expected time on the specific electronic book are present in a database and a second condition that a cardinal number of electronic books in possession accommodated in a predetermined library managed by a specific user is more than or equal to a predetermined threshold are determined as being satisfied, the server may support the user terminal to display the information on the first specific preference index on the specific electronic book through the seventh UI element 720.

Meanwhile, such information on the preference index may be calculated by various algorithms, and its example is given as follows.

For example, the server may additionally acquire and manage information on a first preference index to information on an n-th preference index for each user by using at least part of: (i) a (1_1)-st calculated value to a (1_n)-th calculated value acquired through a predetermined first algorithm by referring to at least part of the information on the first complete-reading probability to the n-th complete-reading probability and the information on the first complete-reading expected time to the information on the n-th complete-reading expected time, (ii) a (2_1)-st calculated value to a (2_n)-th calculated value acquired through a predetermined second algorithm by referring to at least part of each of degrees of author-similarity, each of degrees of field-similarity and each of degrees of library-similarity, and (iii) a (3_1)-st calculated value to a (3_n)-th calculated value acquired through a predetermined third algorithm by referring to at least part of book ranking scores, situational recommendation scores and user participation scores.

The present disclosure has an effect of supporting the user to easily select the specific electronic book by additionally providing the information on the specific complete-reading probability and the information on the specific complete-reading expected time that have not been provided in the conventional art.

The present disclosure has another effect of providing the user interface for supporting the user to retrieve the information on the specific electronic book that is suitable for the user by querying at least part of the information on the specific complete-reading probability and the information on the specific complete-reading expected time.

As seen above, the present disclosure has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method of providing a user interface for retrieving information on one or more electronic books, comprising steps of:

(a) acquiring with a server information on a first electronic book to an n-th electronic book, including information on complete-reading probabilities of each of the first electronic book to the n-th electronic book and information on complete-reading expected times of each of the first electronic book to the n-th electronic book, wherein a first complete-reading probability value to an n-th complete-reading probability value and a first complete-reading expected time value to an n-th complete-reading expected time value corresponding to of each of the first electronic book to the n-th electronic book are acquired by referring to (i) each piece of information on a first reference total page to an n-th reference total page included in each of the first electronic book to the n-th electronic book and (ii) (ii-1) each piece of information on each number of pages read from each of the first electronic book to the n-th electronic book by one or more users among each of the first reference total page to the n-th reference total page and (ii-2) each piece of information on each time taken for the users to read each of the first electronic book to the n-th electronic book, and providing with the server at least one of a first UI element capable of allowing the information on the complete-reading probabilities to be set by a user terminal and a second UI element capable of allowing the information on the complete-reading expected times to be set by the user terminal; and (b) in response to at least one of a specific complete-reading probability range value set through the first UI element and a specific complete-reading expected time range value set through the second UI element inputted by the user terminal which represents a terminal of an information searcher, retrieving with the server information on one or more specific electronic books which are determined as being matched with at least one of the specific complete-reading probability range value and the specific complete-reading expected time range value and then providing the retrieved information on the specific electronic books to the user terminal, wherein, at the step of (a), the server provides, to the user terminal, at least one of the first UI element capable of allowing a first upper limit value and a first lower limit value as queries related to the information on the complete-reading probabilities to be set and the second UI element capable of allowing a second upper limit value and a second lower limit value as queries related to the information on the complete-reading expected times to be set, and wherein, at the step of (b), in response to performing at least one of a process of receiving the first upper limit value and the first lower limit value of the complete-reading probabilities set through the first UI element and a process of receiving the second upper limit value and the second lower limit value of the complete-reading expected times set through the second UI element, the server retrieves information on the specific electronic books, among the first electronic book to the n-th electronic book, which are determined as being matched with at least one of the specific complete-reading probability range value and the specific complete-reading expected time range value by referring to at least one of (i) the first upper limit value and the first lower limit value as the specific complete-reading probability range value and (ii) the second upper limit value and the second lower limit value as the specific complete-reading expected time range value and then provides the retrieved information on the specific electronic books to the user terminal.

2. The method of claim 1, wherein, at the step of (a), in response to additionally acquiring information on each of a first keyword group to a p-th keyword group, to which each of the first electronic book to the n-th electronic book belongs, the server provides, to the user terminal, a third UI element capable of allowing at least one of the first keyword group to the p-th keyword group to be selected, and wherein, at the step of (b), in response to selecting a specific keyword group through the third UI element, the server provides information on a subset of the specific electronic books corresponding to the specific keyword group to the user terminal.

3. The method of claim 1, wherein, at the step of (a), the server additionally provides, to the user terminal, at least one of a fourth UI element capable of allowing a first sorting criterion to be set according to the information on the complete-reading probabilities and a fifth UI element capable of allowing a second sorting criterion to be set according to the information on the complete-reading expected times, and wherein, at the step of (b), in response to receiving at least part of a complete-reading probability sorting criterion through the fourth UI element, as the first sorting criterion, and a complete-reading expected time sorting criterion through the fifth UI element, as the second sorting criterion, the server sorts the specific electronic books by referring to at least one of the complete-reading probability sorting criterion and the complete-reading expected time sorting criterion, and thus provides the sorted specific electronic books to the user terminal.

4. The method of claim 1, further comprising:
(c) in response to detecting a selection for a sixth UI element capable of allowing the server to randomly determine at least part of the information on the complete-reading probabilities and the information on the complete-reading expected times, the server determining at least part of information on randomly-determined complete-reading probability and information on randomly-determined complete-reading expected time, retrieving at least part of information on at least one randomly-determined electronic book which is determined as being matched with at least part of the information on the randomly-determined complete-reading probability and the information on the randomly-determined complete-reading expected time among the first electronic book to the n-th electronic book, and providing the retrieved information on the randomly-determined electronic book to the user terminal.

5. The method of claim 1, wherein, at the step of (a), the server performs at least part of:
a process of displaying (i) a bar-type first graphic element and (ii) a first pointer UI for allowing a (1_1)-st pointer and a (1_2)-nd pointer to be positioned on a (1_1)-st point and a (1_2)-nd point respectively on the first graphic element, as the first UI element, through a first region on a screen of the user terminal; and
a process of displaying (i) a bar-type second graphic element and (ii) a second pointer UI for allowing a (2_1)-st pointer and a (2_2)-nd pointer to be positioned on a (2_1)-st point and a (2_2)-nd point respectively on the second graphic element, as the second UI element, through a second region on a screen of the user terminal.

6. The method of claim 5, wherein, at the step of (a), the server provides, to the terminal, at least one of the first UI element capable of allowing the first upper limit value and the first lower limit value as queries related to the information on the complete-reading probabilities to be set and the second UI element capable of allowing the second upper limit value and the second lower limit value as queries related to the information on the complete-reading expected times to be set, and wherein, at the step of (b), the server performs at least part of:
(i) (i-1) a process of receiving the first upper limit value as a query related to the information on the complete-reading probabilities by supporting the user terminal to position the (1_1)-st pointer on the (1_1)-st point through the first UI element and (i-2) a process of receiving the first lower limit value as a query related to the information on the complete-reading probabilities by supporting the user terminal to position the (1_2)-nd pointer on the (1_2)-nd point through the first UI element,
(ii) (ii-1) a process of receiving the second upper limit value as a query related to the information on the complete-reading expected times by supporting the user terminal to position the (2_1)-st pointer on the (2_1)-st point through the second UI element and (ii-2) a process of receiving the second lower limit value as a query related to the information on the complete-reading expected times by supporting the user terminal to position the (2_2)-nd pointer on the (2_2)-nd point through the second UI element, and
wherein the server provides the information on the specific electronic books to the user terminal by referring to at least part of the first upper limit value, the first lower limit value, the second upper limit value and the second lower limit value.

7. The method of claim 1, wherein, at the step of (a), the server additionally acquires information on a first preference index to information on an n-th preference index for each user by using at least part of:
(i) a (1_1)-st calculated value to a (1_n)-th calculated value acquired through a predetermined first algorithm by referring to at least part of the first complete-reading probability value to the n-th complete-reading probability value and the first complete-reading expected time value to the n-th complete-reading expected time value, (ii) a (2_1)-st calculated value to a (2_n)-th calculated value acquired through a predetermined second algorithm by performing summation or weighted summation of at least part of each of degrees of author-similarity, each of degrees of field-similarity and each of degrees of library-similarity, and (iii) a (3_1)-st calculated value to a (3_n)-th calculated value acquired through a predetermined third algorithm by performing summation or weighted summation of at least part of book ranking scores, situational recommendation scores, user participation scores, and wherein the method further comprises a step of:

(d) the server supporting the user terminal to display information on a first specific preference index on the specific electronic books selected among the information on the first preference index and the information on the n-th preference index for each of the users through a seventh UI element by referring to the information on the users.

8. The method of claim 7, further comprising:

(e) in response to acquiring an input for adjusting the information on the first specific preference index to information on a second specific preference index through the seventh UI element, the server mapping the information on the first specific preference index and the information on the second specific preference related to the specific electronic books onto the information searcher who has adjusted the information on the first specific preference index to the information on the second specific preference index.

9. The method of claim 7, wherein, at the step (d), in response to satisfying a first condition that at least part of the specific complete-reading probability range value and the specific complete-reading expected time range value on the specific electronic books are present and a second condition that a cardinal number of electronic books in possession accommodated in a predetermined library managed by the information searcher is more than or equal to a predetermined threshold, the server supports the user terminal to display the information on the first specific preference index on the specific electronic book specific electronic books through the seventh UI element.

10. A server of providing a user interface for retrieving information on one or more electronic books, comprising:

at least one memory that stores instructions; and
at least one processor configured to execute the instructions to perform or support another device to perform: processes of: (I) acquiring information on a first electronic book to an n-th electronic book, including information on complete-reading probabilities of each of the first electronic book to the n-th electronic book and information on complete-reading expected times of each of the first electronic book to the n-th electronic book, wherein a first complete-reading probability value to an n-th complete-reading probability value and a first complete-reading expected time value to an n-th complete-reading expected time value corresponding to each of the first electronic book to the n-th electronic book are acquired by referring to (i) each piece of information on a first reference total page to an n-th reference total page included in each of the first electronic book to the n-th electronic book and (ii) (ii-1) each piece of information on each number of pages read from each of the first electronic book to the n-th electronic book by one or more users among each of the first reference total page to the n-th reference total page and (ii-2) each piece of information on each time taken for the users to read each of the first electronic book to the n-th electronic book, and providing at least one of a first UI element capable of allowing the information on the complete-reading probabilities to be set by a user terminal and a second UI element capable of allowing the information on the complete-reading expected times to be set by the user terminal; and (II) in response to at least one of a specific complete-reading probability range value set through the first UI element and a specific complete-reading expected time range value set through the second UI element inputted by the user terminal which represents a terminal of an information searcher, retrieving information on one or more specific electronic books which are determined as being matched with at least one of the specific complete-reading probability range value and the specific complete-reading expected time range value and then providing the retrieved information on the specific electronic books to the user terminal, wherein, at the process of (I), the processor provides, to the user terminal, at least one of the first UI element capable of allowing a first upper limit value and a first lower limit value as queries related to the information on the complete-reading probabilities to be set and the second UI element capable of allowing a second upper limit value and a second lower limit value as queries related to the information on the complete-reading expected times to be set, and wherein, at the process of (II), in response to performing at least one of a process of receiving the first upper limit value and the first lower limit value of the complete-reading probabilities set through the first UI element and a process of receiving the second upper limit value and the second lower limit value of the complete-reading expected times set through the second UI element, the processor retrieves information on the specific electronic books, among the first electronic book to the n-th electronic book, which are determined as being matched with at least one of the specific complete-reading probability range value and the specific complete-reading expected time range value by referring to at least one of (i) the first upper limit value and the first lower limit value as the specific complete-reading probability range value and (ii) the second upper limit value and the second lower limit value as the specific complete-reading expected time range value and then provides the retrieved information on the specific electronic books to the user terminal.

11. The server of claim 10, wherein, at the process of (I), on condition that information on each of a first keyword group to a p-th keyword group, to which each of the first electronic book to the n-th electronic book belongs, has been additionally acquired, the processor provides, to the user terminal, a third UI element capable of allowing at least one of the first keyword group to the p-th keyword group to be selected, and wherein, at the process of (II), in response to selecting a specific keyword group through the third UI element, the processor provides information on a subset of the specific electronic books corresponding to the specific keyword group to the user terminal.

12. The server of claim 10, wherein, at the process of (I), the processor additionally provides, to the user terminal, at least one of a fourth UI element capable of allowing a first sorting criterion to be set according to the information on the complete-reading probabilities and a fifth UI element capable of allowing a second sorting criterion to be set according to the information on the complete-reading expected times, and wherein, at the process of (II), in response to receiving at least part of a complete-reading probability sorting criterion through the fourth UI element, as the first sorting criterion, and a complete-reading expected time sorting criterion through the fifth UI element, as the second sorting criterion, the processor sorts the specific electronic books by referring to at least one of the complete-reading probability sorting criterion and the complete-reading expected time sorting criterion, and thus provides the sorted specific electronic books to the user terminal.

13. The server of claim 10, wherein the processor further performs or supports another device to perform a process of:

(III) in response to detecting a selection for a sixth UI element capable of allowing the processor to randomly determine at least part of the information on the complete-reading probabilities and the information on the complete-reading expected times, determining at least part of information on randomly-determined complete-reading probability and information on randomly-determined complete-reading expected time, retrieving at least part of information on at least one randomly-determined electronic book which is determined as being matched with at least part of the information on the randomly-determined complete-reading probability and the information on the randomly-determined complete-reading expected time among the first electronic book to the n-th electronic book, and providing the retrieved information on the randomly-determined electronic book to the user terminal.

14. The server of claim 10, wherein, at the process of (I), the processor performs at least part of:

a process of displaying (i) a bar-type first graphic element and (ii) a first pointer UI for allowing a (1_1)-st pointer and a (1_2)-nd pointer to be positioned on a (1_1)-st point and a (1_2)-nd point respectively on the first graphic element, as the first UI element, through a first region on a screen of the user terminal; and a process of displaying (i) a bar-type second graphic element and (ii) a second pointer UI for allowing a (2_1)-st pointer and a (2_2)-nd pointer to be positioned on a (2_1)-st point and a (2_2)-nd point respectively on the second graphic element, as the second UI element, through a second region on a screen of the user terminal.

15. The server of claim 14, wherein, at the process of (I), the processor provides, to the terminal, at least one of the first UI element capable of allowing the first upper limit value and the first lower limit value as queries related to the information on the complete-reading probabilities to be set and the second UI element capable of allowing the second upper limit value and the second lower limit value as queries related to the information on the complete-reading expected times to be set, and wherein, at the process of (II), the processor performs at least part of:

(i) (i-1) a process of receiving the first upper limit value as a query related to the information on the complete-reading probabilities by supporting the user terminal to position the (1_1)-st pointer on the (1_1)-st point through the first UI element and (i-2) a process of receiving the first lower limit value as a query related to the information on the complete-reading probabilities by supporting the user terminal to position the (1_2)-nd pointer on the (1_2)-nd point through the first UI element, (ii) (ii-1) a process of receiving the second upper limit value as a query related to the information on the complete-reading expected times by supporting the user terminal to position the (2_1)-st pointer on the (2_1)-st point through the second UI element and (ii-2) a process of receiving the second lower limit value as a query related to the information on the complete-reading expected times by supporting the user terminal to position the (2_2)-nd pointer on the (2_2)-nd point through the second UI element, and wherein the processor provides the information on the specific electronic books to the user terminal by referring to at least part of the first upper limit value, the first lower limit value, the second upper limit value and the second lower limit value.

16. The server of claim 10, wherein, at the process of (I), the processor additionally acquires information on a first preference index to information on an n-th preference index for each user by using at least part of:

(i) a (1_1)-st calculated value to a (1_n)-th calculated value acquired through a predetermined first algorithm by referring to at least part of the first complete-reading probability value to the n-th complete-reading probability value and the first complete-reading expected time value to the n-th complete-reading expected time value, (ii) a (2_1)-st calculated value to a (2_n)-th calculated value acquired through a predetermined second algorithm by performing summation or weighted summation of at least part of each of degrees of author-similarity, each of degrees of field-similarity and each of degrees of library-similarity, and (iii) a (3_1)-st calculated value to a (3_n)-th calculated value acquired through a predetermined third algorithm by performing summation or weighted summation of at least part of book ranking scores, situational recommendation scores, user participation scores, and wherein the processor further performs or supports another device to perform a process of:

(IV) supporting the user terminal to display information on a first specific preference index on the specific electronic books selected among the information on the first preference index and the information on the n-th preference index for each of the users through a seventh UI element by referring to the information on the users.

17. The server of claim 16, wherein the processor further performs or supports another device to perform a process of:

(V) in response to acquiring an input for adjusting the information on the first specific preference index to information on a second specific preference index through the seventh UI element, mapping the information on the first specific preference index and the information on the second specific preference related to the specific electronic books onto the information searcher who has adjusted the information on the first specific preference index to the information on the second specific preference index.

18. The server of claim 16, wherein, at the process (IV), in response to satisfying a first condition that at least part of the specific complete-reading probability range value and the specific complete-reading expected time range value on the specific electronic books are present and a second condition that a cardinal number of electronic books in possession accommodated in a predetermined library managed by the information searcher is more than or equal to a predetermined threshold, the processor supports the user terminal to display the information on the first specific preference index on the specific electronic books through the seventh UI element.

* * * * *